United States Patent
Kajitani

[11] 3,977,504
[45] Aug. 31, 1976

[54] SHOT-PEENED DIAPHRAGM CLUTCH SPRING

[75] Inventor: Kouji Kajitani, Hirakata, Japan

[73] Assignee: Kabushiki Kaisha Daikin Seisakusho, Japan

[22] Filed: Sept. 19, 1975

[21] Appl. No.: 615,106

[30] Foreign Application Priority Data
Oct. 2, 1974 Japan.............................. 49-114172

[52] U.S. Cl. ............................. 192/89 B; 267/161
[51] Int. Cl.² ........................................ F16D 13/44
[58] Field of Search .................... 192/89 B; 267/161

[56] References Cited
FOREIGN PATENTS OR APPLICATIONS
988,673   4/1965   United Kingdom ............... 192/89 B Primary Examiner—Benjamin W. Wyche
Attorney, Agent, or Firm—Pierce, Scheffler & Parker

[57] ABSTRACT

This invention relates to a diaphragm spring serving as a clutch spring for applying engaging force to the clutch, in which a shot-peened layer is provided only on a concave rear surface of said diaphragm spring, especially only on a surface of the pressure plate side of a peripheral annulus which is subjected to tensile stress in engaging the clutch. According to this invention, an early decrease (yielding) in spring force of said diaphragm spring can be avoided.

1 Claim, 4 Drawing Figures

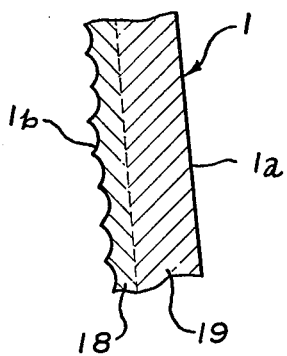
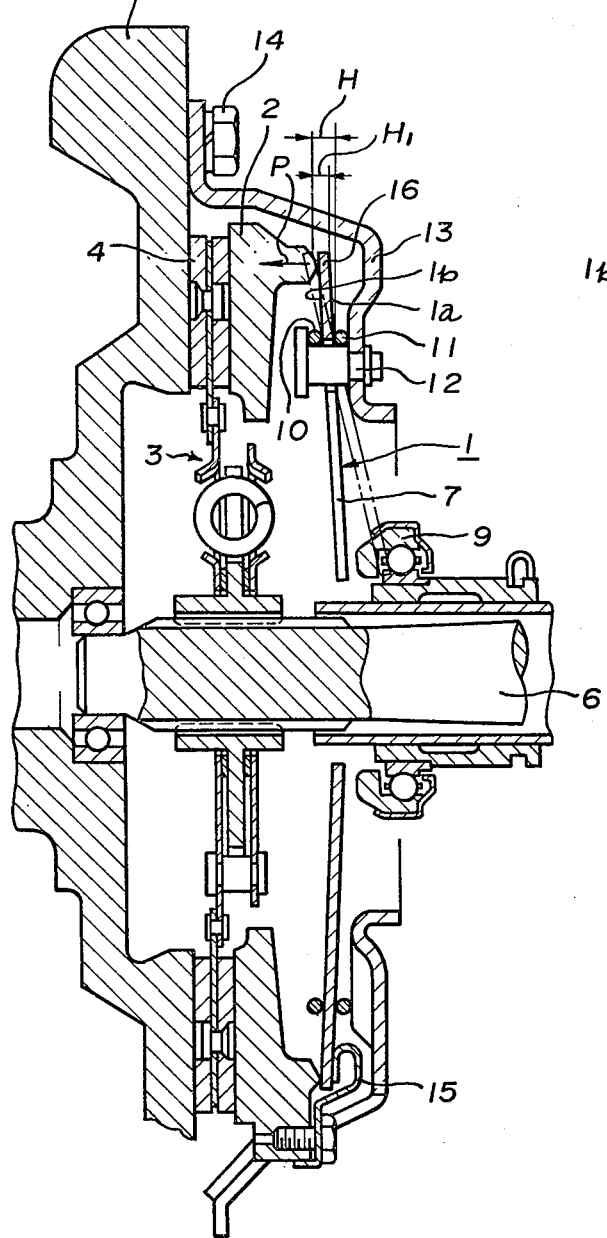

SHOT-PEENED DIAPHRAGM CLUTCH SPRING

This invention relates to a diaphragm spring serving as a clutch spring, and the primary inventive object is to provide a simple construction by which an early yielding, i.e., decrease in spring force, can be avoided.

The diaphragm spring of the invention is characterized in that the concave rear surface (or portion thereof) of the spring is shot-peened whereas the convex front surface of the spring is not shot-peened.

The invention will be disclosed in detail in the following description, taken with the appended drawing, in which:

FIG. 1 is a vertical, partially sectional, view showing an engaged condition of a clutch equipped with the diaphragm spring in accordance with this invention;

FIG. 4 is a partially enlarged view of the diaphragm spring of FIG. 1.

Figure 2:
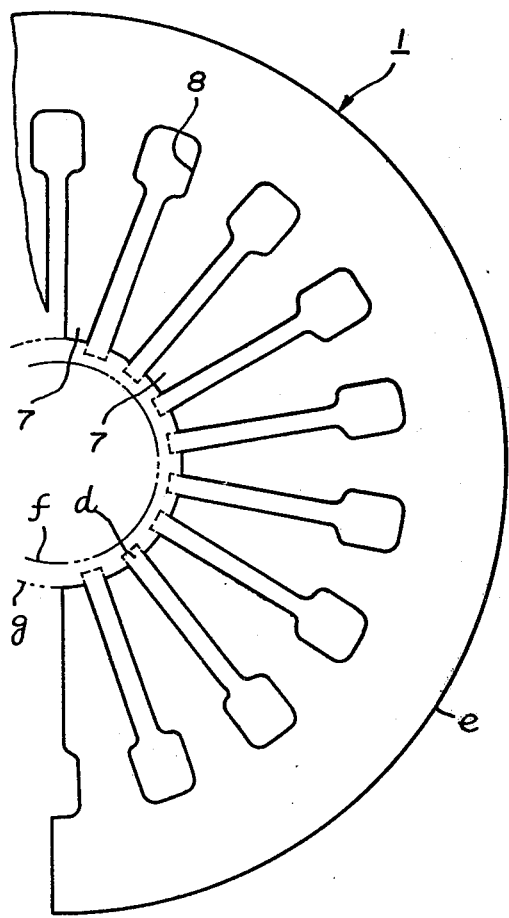
FIG. 2 is a front elevation viewing from the right side of the diaphragm spring of FIG. 1.

FIG. 1 is a vertical, partially sectional, view showing the engaged condition of a clutch for use in an automobile using a diaphragm spring 1; in which a peripheral annulus (spring portion) 16 functioning as a spring of said diaphragm spring 1 is deflected by an amount $H_1$ as compared with free height H thereof, and presses a peripheral lining 4 of a clutch disk 3 through the medium of a pressure plate 2 against an engine fly-wheel 5; so that engine power is transmitted from the engine fly-wheel 5 through the clutch disk 3 to an output shaft 6. As shown in FIG. 2, the diaphragm spring 1 is provided with a plurality of reed pieces 7, 7 and with pin holes 8, 8 at the roots of adjoining reed pieces 7 and 7. A central part of a convex side surface $1a$ (FIG. 1) i.e. the tip end of the reed piece 7, faces against a release bearing 9 with some gap between them, and an outer periphery of a concave side surface $1b$ of the peripheral annulus (spring portion) 16 functioning as a spring presses against a projection of the pressure plate 2. 10 and 11 are wire rings, 12 is a stud pin, 13 is a clutch cover, and 14 is a clutch cover fixing bolt.

In order to disengage the clutch, the release bearing 9 is shifted toward the left in FIG. 1 by operating a clutch pedal (not shown) to apply pressure on the tip end of the reed piece 7. Then, reed piece 7 functions as a lever with its supporting point on the wire ring 10, the diaphragm spring 1 is bent backward, a load P which has been applied on the pressure plate 2 in the arrowed direction is removed; at the same time the pressure plate 2 is separated from the lining 4 through the function of a clip 15, and the lining 4 is also separated from the fly-wheel 5, thereby the engine power being cut off. Removing the left-ward force applied on the release bearing 9, the components move back to their original positions as illustrated in FIG. 1, and the diaphragm spring 1 is enabled to return to the free condition so as to apply the load on the pressure plate 2 in the arrowed (left-ward) direction.

As mentioned above, the spring portion 16 of the diaphragm spring 1 is deflected, for example, by an amount $H_1$ from the height H when put in use, so that a tensile stress is set up on the concave rear surface $1b$ of the peripheral annulus (spring portion) 16 which functions as a spring, and a compressive force is set up on the convex surface $1a$ of 16. In released condition, both stresses further increase. Moreover, a compressive stress is set up on the concave rear surface $1b$ of the reed piece 7, and a tensile stress is set up on the convex surface $1a$ when being released.

Because the spring is apt to be broken due to an increase in tensile stress on the outer surface of the spring material, it heretofore has been proposed that shot-peening work be carried out on both front and rear surfaces of the diaphragm spring. When shot-peening work is done on a surface a compressive stress remains thereon, which stress provides the same condition as being pre-stressed, so that tensile stress is substantially decreased on the concave rear surface $1b$ of the annular spring portion 16 which is applied with the tensile stress when put in use, thus providing effective results in order to avoid the breakage of the spring. In conventional diaphragm springs, however, a residual compressive stress is also previously applied on the surface $1a$ by means of shot-peening work, so as to be inevitably accompanied by the trouble that the compressive stress on the surface $1a$ of the annular spring portion 16 is substantially increased whereby to cause a larger yielding thereof when put in use.

Figure 3:
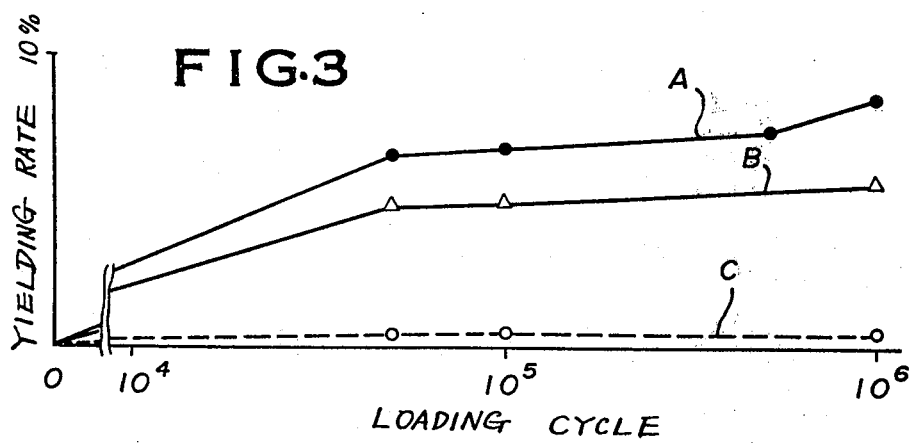
FIG. 3 is a diagram indicating the relation between yielding rate and loading cycle data obtained by an endurance test.

In the present invention, the expression "yielding" means a decrease in the spring force P which is applied on the pressure plate 2 by means of the diaphragm spring 1 in the arrowed direction, and it can be numerically expressed by the force yielding rate as indicated in FIG. 3. The force yielding rate is a ratio of P–P' to P when the spring force P decreases to P'. In FIG. 3, A is a result of stroking endurance test in which a load repeatedly is applied on a conventional diaphragm spring being shot-peened on both front and rear surfaces thereof, and the force yielding rate largely increases with an increase in the times of applying the load. That is, after the test of $10^6$ load repeating, the force decreases by about 8.5%.

Paying attention to the fact that the residual stress on the front surface of the spring portion 16 especially aggravates the yielding when shot-peening work is carried out on both front and rear surfaces of the diaphragm spring, it is an object of the present invention to avoid the above-mentioned trouble, and a feature thereof is to provide the shot-peened surface layer only on the concave rear side on the whole surface or periphery of the spring portion.

In FIG. 4, 18 is the shot-peened layer provided on the concave rear surface $1b$, by which the residual compressive stress is applied thereon. 19 is the remaining layer on the other side which is not affected by the shot-peening work, and there is no residual stress on the convex front surface $1a$. In such a manner, the residual stress remains on the shot-peened layer 18 of the concave rear surface $1b$, so that a tensile stress acting on the concave rear surface $1b$ when put in use can be kept as small as possible, and the durability of the spring is materially enhanced. Moreover, since shot-peening work is not carried out on the surface $1a$ which will be applied with compressive stress when put in use, there is no risk that compressive stress excessively increases; thus, the yielding can considerably be lessened.

In FIG. 3, B indicates the characteristic of the diaphragm spring in accordance with this invention. As seen from this test result, the force yielding rate decreases to about two thirds as compared with A at a repeating cycle of $10^6$. This means a tremendous improvement in performance in the technical field of clutches.

An example of manufacturing method of the diaphragm spring in accordance with this invention is explained as follows:

1. Slit punching;
   A process of punching the slit d in FIG. 2 from the steel plate
2. Inner and outer diameters punching;
   A process of punching e and f in FIG. 2
3. Grinding
4. Inner diameter punching;
   A process of punching g in FIG. 2
5. Conical forming
6. Heat treatment
   Quenching and tempering
7. Correction of conical forming
8. Shot-peening
   Applied only on the concave rear surface
9. Heat treatment
   Tempering with the diaphragm spring held at a loaded condition, using a jig.

The above-mentioned heat treatment process (9) is especially adopted when the clutch is put in use under serious condition according to the range of use, and the diaphragm spring thus subjected to the final process presents the characteristic C in FIG. 3.

As mentioned above, the present invention has practical utility. Not only the durability of the spring portion 16 against breakage can be improved, but also the yielding of the spring can largely be lessened. Further, there is the advantage that the number of man-hours for shot-peening can be decreased to one-half of the conventional shot-peening period.

I Claim:

1. A diaphragm spring for diaphragm spring-type clutch, which comprises
   a peripheral annulus (16) functioning as a spring;
   a plurality of reed pieces (7), (7) inwardly extending from said peripheral annulus (16) to function as a release lever;
   stud pin holes (8), (8) at the roots of reed pieces (7), (7);
   a radially inwardly extending rim of said peripheral annulus (16) supported between wire rings (10) and (11) arranged between a clutch cover (13) and a head of a stud pin (12) fixed to said clutch cover (13), an outer periphery thereof being contacted against a pressure plate (2); at least a portion of the concave rear surface (1b) only of the peripheral annulus (16) of said diaphragm spring being provided with a shot-peened layer.

* * * * *